United States Patent [19]
Hattori

[11] Patent Number: 5,223,925
[45] Date of Patent: Jun. 29, 1993

[54] AUTOSTEREOSCOPIC SYSTEM

[76] Inventor: Tomohiko Hattori, 6-12, Daikou 3-chome, Higashi-ku, Nagoya-shi, Aichi-ken, Japan

[21] Appl. No.: 783,348

[22] Filed: Oct. 28, 1991

[30] Foreign Application Priority Data

Oct. 28, 1990 [JP] Japan .................. 2-291025
Oct. 14, 1991 [JP] Japan .................. 3-295107

[51] Int. Cl.⁵ .................. H04N 13/00; H04N 15/00
[52] U.S. Cl. .................. 358/88; 358/3
[58] Field of Search .................. 358/88, 3

[56] References Cited

U.S. PATENT DOCUMENTS

| | | | |
|---|---|---|---|
| 3,525,807 | 8/1970 | Herriott | 358/88 |
| 4,943,860 | 7/1990 | Hattori | 358/88 |
| 5,036,385 | 7/1991 | Eichenlaub | 358/88 |
| 5,063,441 | 11/1991 | Lipton | 358/88 |

Primary Examiner—Howard W. Britton
Attorney, Agent, or Firm—Cushman Darby & Cushman

[57] ABSTRACT

An autostereoscopic system has a taking section for taking an image of a predetermined reference plane and outputting an image signal composed of a plurality of parallax images based on the taken image of the predetermined reference plane, and a playback section for reproducing a 3-D image based on the image signal output by the taking section. The taking section is composed of TV cameras, each having a convex lens and an image pickup screen, which are arranged in the horizontal direction, and the playback section is composed of image output screens arranged in the horizontal direction for outputting inverted parallax images of those at the image pickup screen, a large Fresnel convex lens disposed in front of the image output screens, and convex lenses, each being disposed between each of the image output screens and the large Fresnel convex lens, for projecting the inverted parallax images on or along the effective lens plane of the large Fresnel convex lens.

18 Claims, 8 Drawing Sheets

AUTOSTEREOSCOPIC SYSTEM

BACKGROUND OF THE INVENTION

1. Field of the Invention

The present invention relates to an autostereoscopic system, and more particularly to an autostereoscopic system which permits the observation of a three-dimensional image by several persons simultaneously and is suited to mass production.

2. Description of the Prior Art

Conventional autostereoscopic systems include an Anaglyph system using special polarized glasses or shutter glasses; glasses-free systems such as a parallax stereogram, a lenticular system, a large concave mirror system and a large convex lens system; multiplex systems such as a parallax stereogram, integral system and a lenticular system using a lenticular sheet: spatial modulation such as a varifocal mirror system, a rotary cylinder system, a screen laminating system, a half-mirror synthesizing system and a screen vibrating system: holography such a laser playback holography and white light hologram.

However, these systems are not practical for general domestic and business purpose, although they can be used in certain special situations.

In broadcasting media, Anaglyph system using red and blue glasses, and density difference system using Pulfrich effect have been tried. However, these systems have drawbacks that special glasses are required and a look around capability is not obtained. Accordingly, these systems are difficult to be put to practical use.

The above-described conventional systems have features as shown in Table 1.

As is apparent from Table 1, systems other than the glasses, systems also have drawbacks such as that the reproduced image cannot be observed simultaneously by plural persons, that the systems are not suited to mass production, high resolution cannot be obtained, or they do not have a look around capability. Therefore, autostereoscopic system which can be practically used for both domestic use and business use has not been realized as yet.

In Table 1, ⊙ means "possible with especially good result", ○ means "possible", Δ means "sometimes possible" and × means "impossible".

TABLE 1

| Kind of 3D images | Glasses | Playback of landscape | Watching by plural persons | Color-ing | Anima-tion | Mass pro-duction | Reso-lution | Look around capa-bility |
| --- | --- | --- | --- | --- | --- | --- | --- | --- |
| Binocular 3D images | | | | | | | | |
| Anagliph method | Necessary | ○ | ○ | × | ○ | ○ | ○ | × |
| Polarization method | Necessary | ○ | ○ | ○ | ○ | ○ | ○ | × |
| Time sharing method | Necessary | ○ | Δ~○ | ○ | ○ | ○ | ○ | × |
| No glasses method | Unnecessary | ○ | × | ○ | ○ | ○ | ○ | × |
| Real 3D images | | | | | | | | |
| Multiplex method (Integral method) | Unnecessary | ○ | X~Δ | ○ | ○ | Δ | × | Δ |
| Spatial modulation | Unnecessary | × | Δ | ○ | Δ | Δ | Δ | ○ |
| Holography | Unnecessary | × | ○ | X~○ | X~○ | × | Δ | ⊙ |

SUMMARY OF THE INVENTION

It an object of the present invention is to provide an autostereoscopic system which enables reproduced images with high resolution, simultaneous observation of a reproduced image by plural persons without using special glasses while imparting a look around capability prevention of an increase of the frequency band width of image signals, and which is suited to mass production.

In order to achieve the above object, the present inventor has contemplated various systems in developing the present invention. One system among them is shown in FIGS. 7 and 8.

Figure 7:
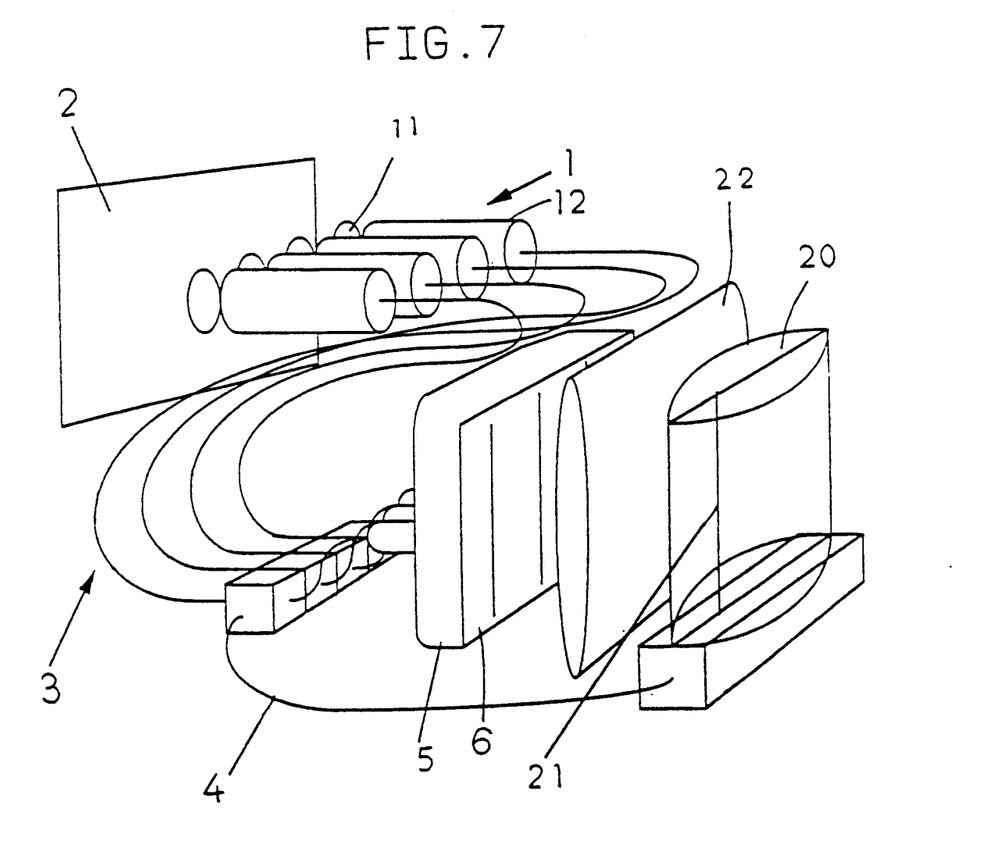
FIG. 7 is an overall perspective view of an autostereoscopic system contemplated by the inventor during his development of the system of the present invention.
Figure 8A:
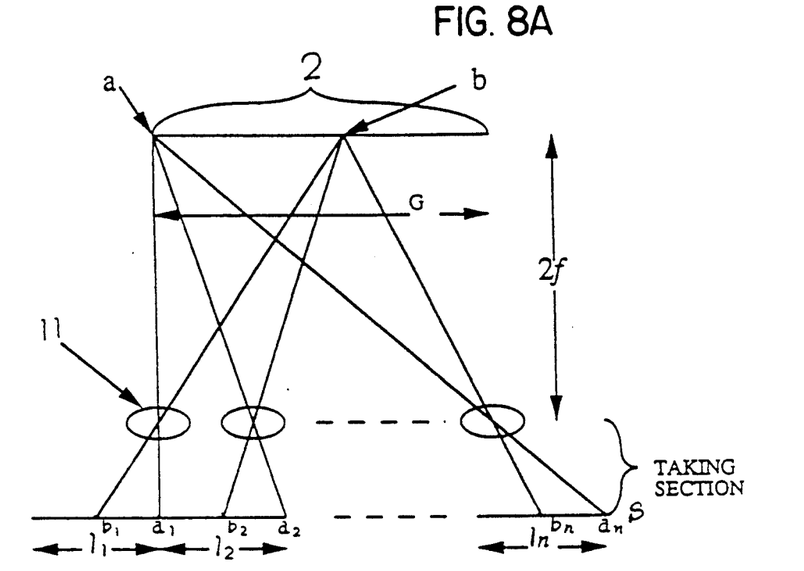
FIG. 8 is a plan view of optical paths in the system of FIG. 7.
Figure 8B:
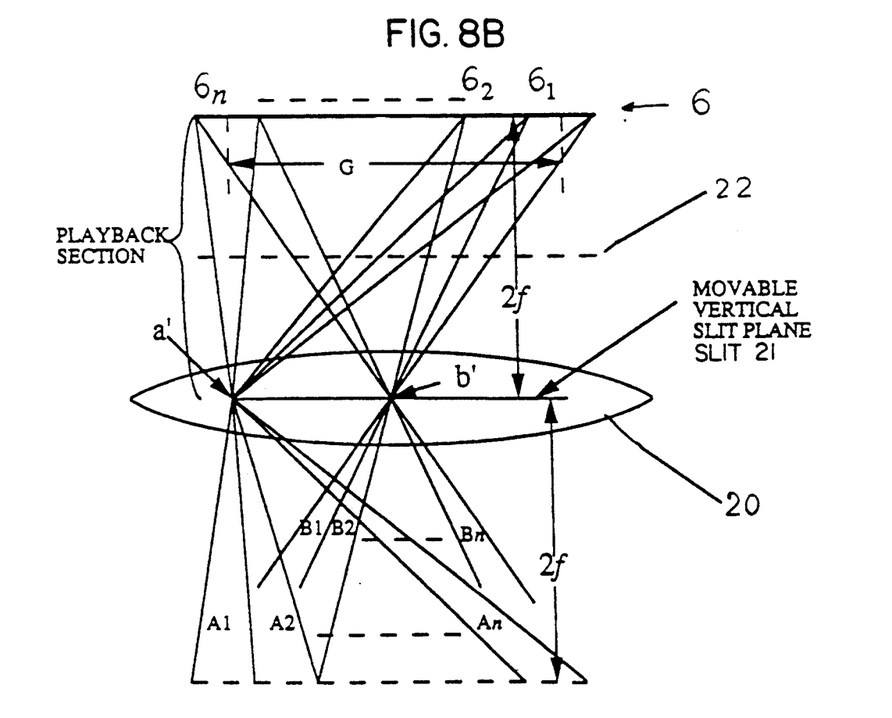

As shown in FIG. 7, in the taking sect ion, four TV cameras 1 are arranged in parallel with each other in the horizontal direction so that the image pickup screens S (FIG. 8); of vidiocons 12 of the TV cameras 1 are located on the same vertical plane. Each TV camera i is provided with a lens 11 of which an optical axis to perpendicularly intersects to each image pickup screen S.

The image pickup screen S are arranged so that each TV camera 1 takes an image of a predetermined reference plane 2.

Based on four image signals from the four TV cameras 1, four electron guns and polarized coils within four cathode ray tubes (CRTs 5 scan electron fanbeams only in the vertical direction using vertical focusing according to the TV image horizontal scanning signals from the TV cameras 1. The electron fanbeams are separated into four areas of the phosphor plane as an image output screen 6 of CRTs 5, and synchronized with vertical image scanning at the image pick-up screens S the vidicons 12 of the four TV cameras 1.

A large horizontally focusing cylindrical lens 20 is disposed in front of the image output screens 6. A vertical slit 21 is provided movably in the horizontal direction on or along the effective lens plane of the large horizontally focusing cylindrical lens 20.

A large vertically focusing cylindrical lens 22 is further disposed between the image output screens 6 and the horizontally focusing cylindrical lens 20. Reference numerals 3, 4 designate coaxial cables for TV images and a vertical scanning signal, respectively.

With the system having the above-described constitution, by horizontally scanning the vertical slit 21 in the direction opposite to that of the horizontal image scanning at the image pickup screens S of the TV cameras 1 in synchronization therewith, n parallax images on the predetermined reference plane 2 are reproduced on the plane of the vertical slit 21.

By disposing the vertically focusing cylindrical lens 22 between the image output screens 6 and the horizontally focusing cylindrical lens 20, the vertical component of the image also can be also projected on the plane of the vertical slit 21 without influencing the horizontal component of the image. This results in both the horizontal component and vertical component of the reproduced three-dimensional (3-D) image appearing on the plane of the vertical slit 21 without any distortion.

Hereinafter, the above-described system ill be explained with reference to FIG. 8 which is a plan view of optical paths in t he system.

Both the distance between the reference plane 2 and the convex lens 11 of the TV cameras 1 and the distance between the image output screens 6 and the plane of the vertical slit 21 are two times the focal length (f) of the horizontally focusing cylindrical lens 20.

The focal length of the vertically focusing cylindrical lens 22 disposed between the image pickup screens 6 and the horizontally focusing cylindrical lens 20 is f/2.

The horizontally movable range of the vertical slit 21 is identical to the horizontal length (G) of the reference plane 2. In the image output screens 6, the distance between the center of the area $6_1$ and the center of the area $6_n$ is identical to G.

The ray which passes the reference point a and is incident on the convex lens 11 of the TV camera $1_1$ reflects at the point $a_1$ on the image pickup screen S. The image output screen $6_1$ of the playback section emits luminance corresponding to that of the point $a_1$.

When the horizontally scanning position on the image pickup screen S is $a_1$, the vertical slit 21 is positioned at the point a' and emits a fanbeam A1.

With regard to the rays which are incident on the other TV cameras $1_2$ to $1_n$, fanbeams A2 to An are emitted from the vertical slit positioned at the point a' similarly to the case of the fanbeam A1.

As a result, n slit-like different parallax images are produced.

With regard to the point b on the reference plane 2, fanbeams B1 to Bn are emitted from the point b' on the plane of the vertical slit 21 to produce n different parallax images similarly to the case of the rays to the point a.

Accordingly, due to the movement of the vertical slit 21 by the length G, a 3-D image composed of n parallax images can be viewed. The most suitable observation position of the 3-D image is distant from the plane of the vertical slit 21 by 2f.

When n is 3 or more, the look around capability is imparted.

As a result of many studies, the present inventor has succeeded in the development of the autostereoscopic system which is produced more inexpensively and is more practical, as compared with the above-described system provided with a vertical slit.

The system of the present invention has a taking section for taking an image of a predetermined reference plane with its taking range coincided with the predetermined reference plane, and outputting an image signal composed of a plurality of parallax images based on the taken image of the predetermined reference plane, and a playback section composed of an image output screen having a plurality of image output areas arranged in parallel with each other in the horizontal direction for outputting a plurality of inverted parallax images of those of said image signal output by the taking section, a large format lens disposed in front of the image output areas of the image output screen, and a plurality of image projecting members arranged in parallel with each other in the horizontal direction with substantially no space therebetween. The plurality of image projecting members are disposed between the image output screen and the large format lens for projecting the inverted parallax images on or along the effective lens plane of the large format lens in the range equivalent to the reference plane.

The autostereoscopic system of the present invention has advantages similar to those of the system provided with a vertical slit. Furthermore, the system of the present invention has another advantage that it is unnecessary to provide both the vertical slit and the vertically focusing cylindrical lens because the image projecting members disposed in front of the image output screen project rays which direct to the large format lens in various directions.

Moreover, it is not necessarily required to synchronize the n image scanning with the image signal.

As is apparent from the foregoing, the system of the present invention solves all the drawbacks of the conventional systems. The system of the present invention enables the playback of 3-D images with high resolution, simultaneous observation of the reproduced 3-D image by plural persons without using special glasses while exhibiting a look around capability, and is suited to mass production.

BRIEF DESCRIPTION OF THE DRAWING

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
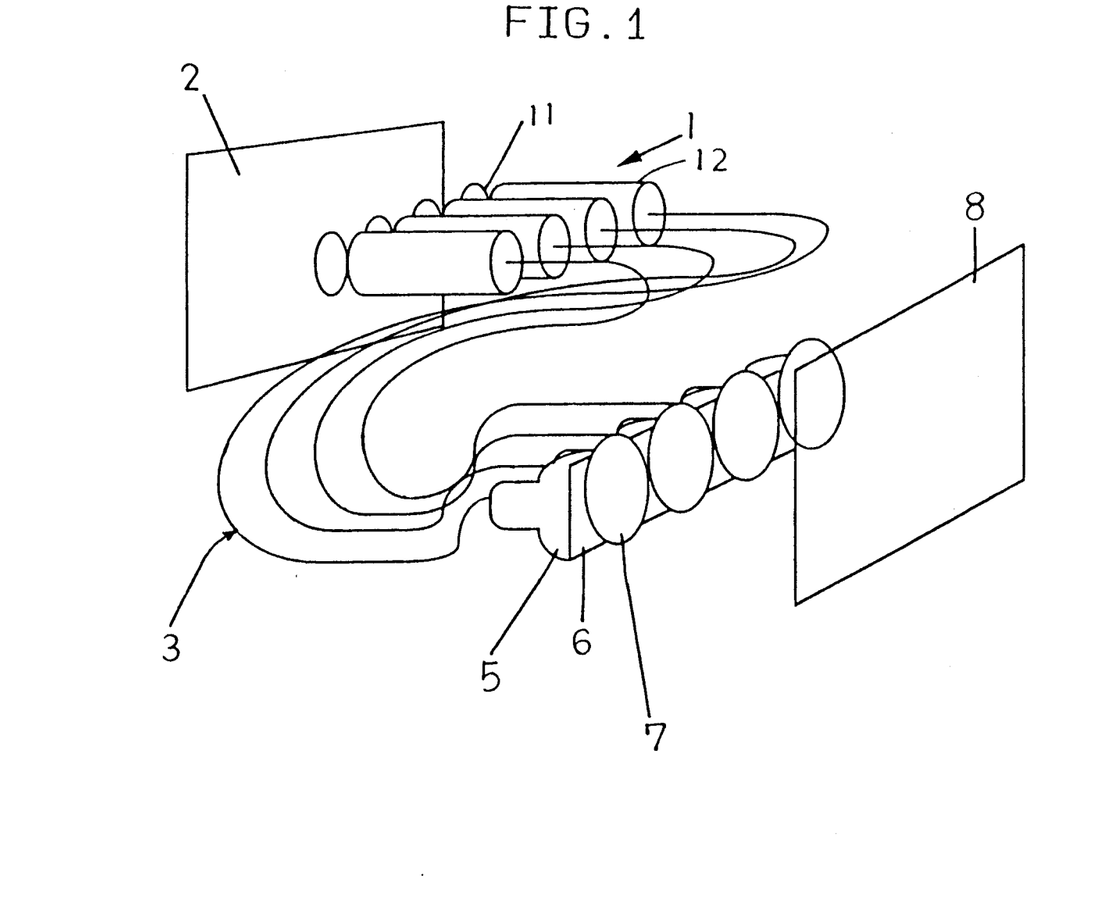
FIG. 1 is an overall perspective view of a first embodiment of an autostereoscopic system in accordance with the present invention.
Figure 2A:
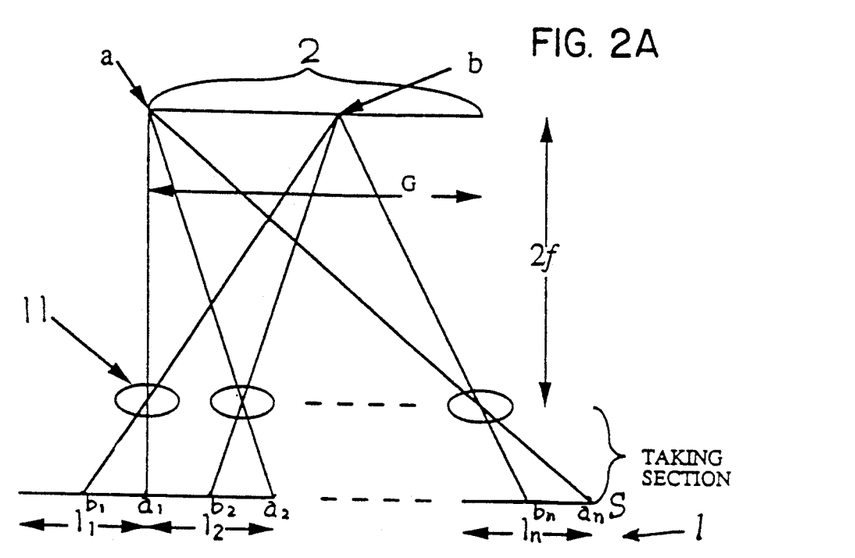
FIG. 2 is a plan view of optical paths in the first embodiment.
Figure 2B:
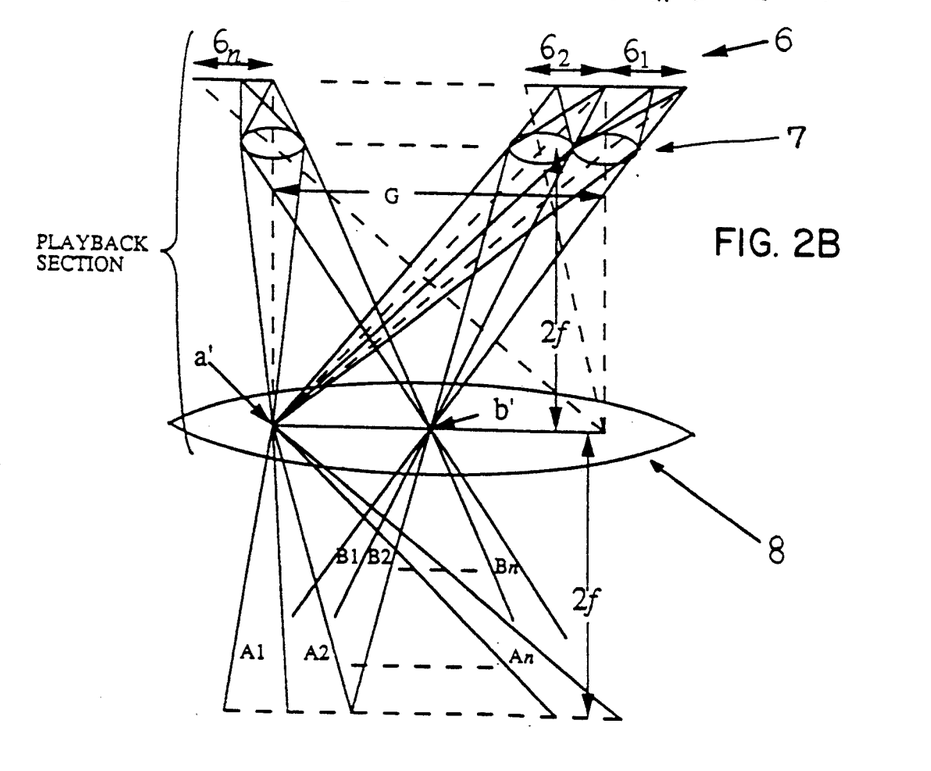

Regarding FIGS. 1 and 2 which illustrate a first embodiment of the present invention, the number of the parallax images is set to an arbitrary number, and the same number of TV cameras are prepared. In the first embodiment, the number of the parallax images is set to four and four TV cameras are arranged in parallel with each other in the horizontal direction.

Each TV camera 1 has a convex lens 11 composed of a relatively large image circular lens having a focal length identical to that of another lens 11. Previously, the convex lenses 11 are moved in the horizontal direction so as to take an image of a predetermined reference plane 2 and are held in place. Thus, the taking section of the autostereoscopic system is so composed.

Four TV cameras 1 are connected to respective four CRTs 5, each having a flat image output screen 6, by ay of four coaxial cables 3 in the order opposite to the order of the TV cameras 1.

Convex lenses 7 as t he image projecting members are disposed in front of the respective image output screens 6 of the CRTs 5. A large Fresnel convex lens 8 as the large format lens is disposed in front of the convex lenses 7.

Each lens 7 is 6.5 cm in diameter and 6.3 cm in focal length. The large Fresnel convex lens 8 is 20 cm in focal length, 24.4 cm in length and 32.5 cm in width.

The distance between the image output screens 6 and the convex lenses is 5 cm, the distance between the convex lenses 7 and the large Fresnel convex lens 8 is 40 cm which is two times the focal length of the large Fresnel convex lens 8. The distance between the large Fresnel convex lens 8 and the most suitable observation position is also 40 cm.

The reference plane 2 is 24.4 cm in length and 32.5 cm width. The distance between the reference plane 2 and the effective lens plane of the four lenses 11 of the TV cameras 1 is 40 cm. The reference numeral 12 designates a vidicon of each TV camera 1.

With the system of t he first embodiment having the above-described constitution, the geometric configuration of the optics which is shown in FIG. 2 is equivalent to that shown in FIG. 8.

The images of the reference plane 2 taken by the TV cameras 1 in the taking section are output at the image output screens 6 of the CRTs 5 in the playback section as inverted parallax images of the parallax images at the image pickup screens S of the TV cameras.

The image output screens 6 respectively project rays to the effective lens plane of the large Fresnel convex lens 8 by way of the convex lenses 7.

The projected images can be viewed at the position distant from the effective lens plane of the large Fresnel convex lens 8 by the distance two times the focal length (f) of the large Fresnel convex lens 8.

With regard to the ray passing the point a on the reference plane 2, for example, the image output screens $6_1$ to $6_n$ output rays to the point a' on the effective lens plane of the large Fresnel convex lens 8 after passing the convex lenses 7. Then, fanbeams A1 to An are emitted from the point a' of the large Fresnel convex lens 8 with the result that n different parallax images are produced.

With regard to the ray passing the point b on the reference plane 2, the point b' on the effective lens plane of the large Fresnel convex lens 8 emits fanbeams B1 to Bn with the result that n different parallax images are produced.

As a result, a 3-D image composed of n parallax images is produced based on the rays passing all points on the reference plane 2.

The first embodiment satisfies the following image forming equation:

$$1/d + 1/D = 1/f$$

where f is the focal length of the large Fresnel convex lens 8, d is the distance between the effective lens plane of each lens 7 and that of the large Fresnel convex lens 8, and D is the distance between the effective lens plane of the large Fresnel convex lens 8 and the most suitable 3-D image observation position.

With the first embodiment, both the horizontal and vertical resolution of the 3-D image are determined only by the vertical resolution of the image output screens 6 of the CRTs 5. Therefore, the resolution of the system of the first embodiment is higher, as compared with the conventional system using a horizontally focusing lenticular plate so that the system of the first embodiment can be applied to the high resolution system such as HDTV.

Furthermore, in the system of the present embodiment, n channels of TV lines are sufficient for playing back the 3-D image composed of n parallax images. Accordingly, the frequency band width is not overly increased.

Moreover, with the present embodiment, a look around capability is obtained if the number of the parallax images is 3 or more, and a 3-D image can be simultaneously viewed by plural observers without lasses or other special instrument. Therefore, the system of the first embodiment can be put into practical application, and the overall system is suited to mass production.

In addition, the 3-D playback of landscape pictures or animation pictures, and coloring of the 3-D image are also possible. Accordingly, the system of the present embodiment is free from the drawbacks of the conventional holography system.

Figure 3:
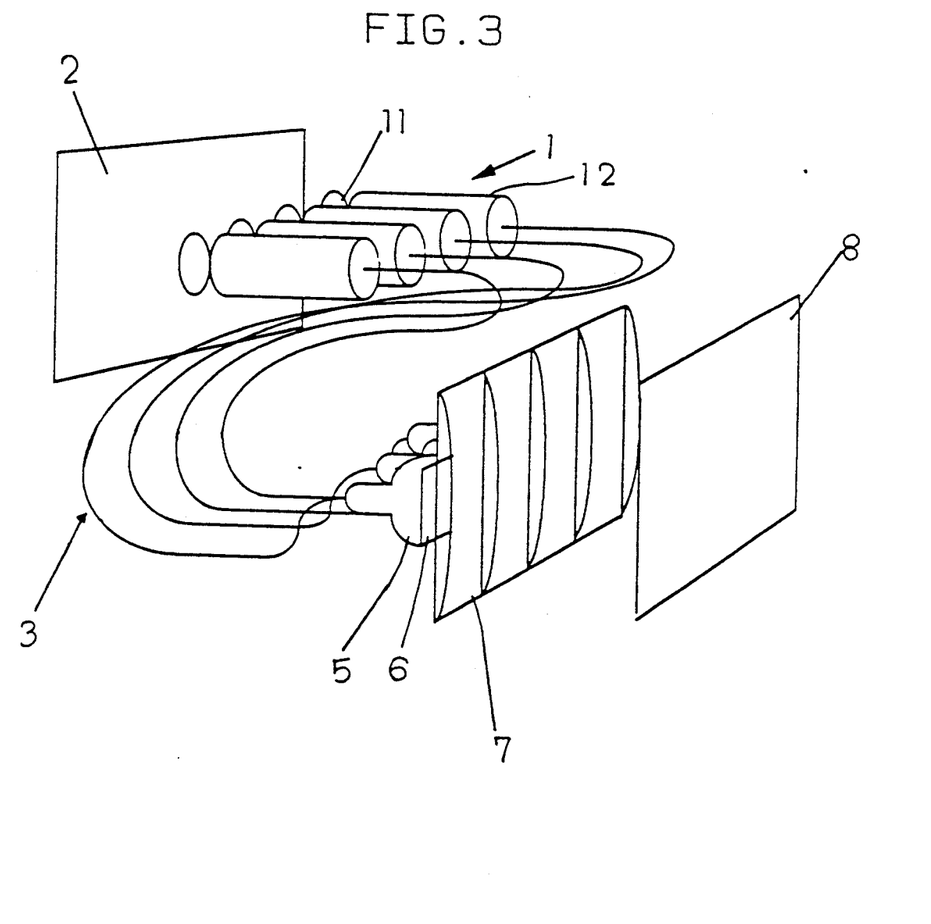
FIG. 3 is an overall perspective view of a second embodiment of an autostereoscopic system in accordance with the present invention.

FIG. 3 illustrates a second embodiment of the present invention.

In the second embodiment, each convex lens 7 which is disposed in front of each of the image output screens 6 of the CRTs 5 has an elongated configuration in the vertical direction. The remainder of the constitution of the system of the second embodiment is identical to that of the first embodiment.

With the second embodiment, similar operational effect to that of the first embodiment can be achieved.

Moreover, with the second embodiment, the vertical observation area can be extended because such area increases with the increase in the vertical length of the convex lenses 7.

Figure 4:
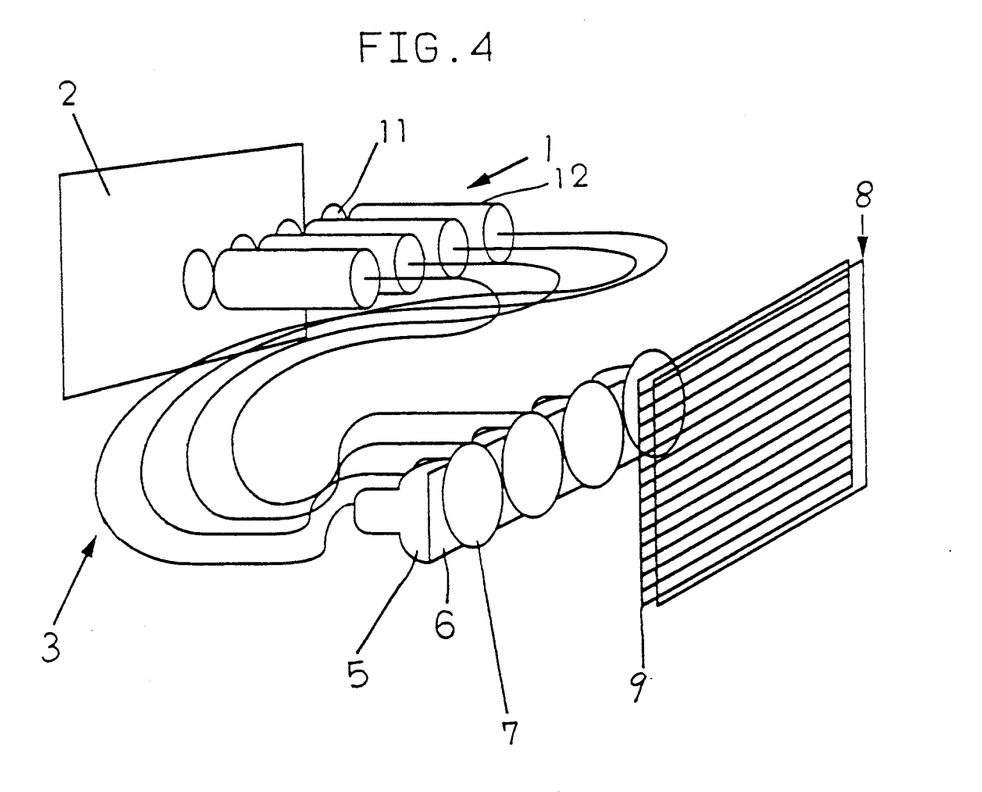
FIG. 4 is an overall perspective view of a third embodiment of an autostereoscopic system in accordance with the present invention.

FIG. 4 illustrates a third embodiment of the present invention.

In the third embodiment, a vertically focusing lenticular sheet 9 is disposed near the large Fresnel convex lens 8 and faces the convex lenses 7. The vertically focusing lenticular sheet 9 is 0.5 mm in pitch, 1.25 mm in focal length, 24.4 cm in length and 32.5 cm in width.

The remainder of the constitution of the system of the third embodiment is identical to that of the first embodiment.

The vertically focusing lenticular sheet 9 diffuses rays only in the vertical direction. Therefore, the third embodiment also achieves the same operational effect as that of the second embodiment.

Figure 5:
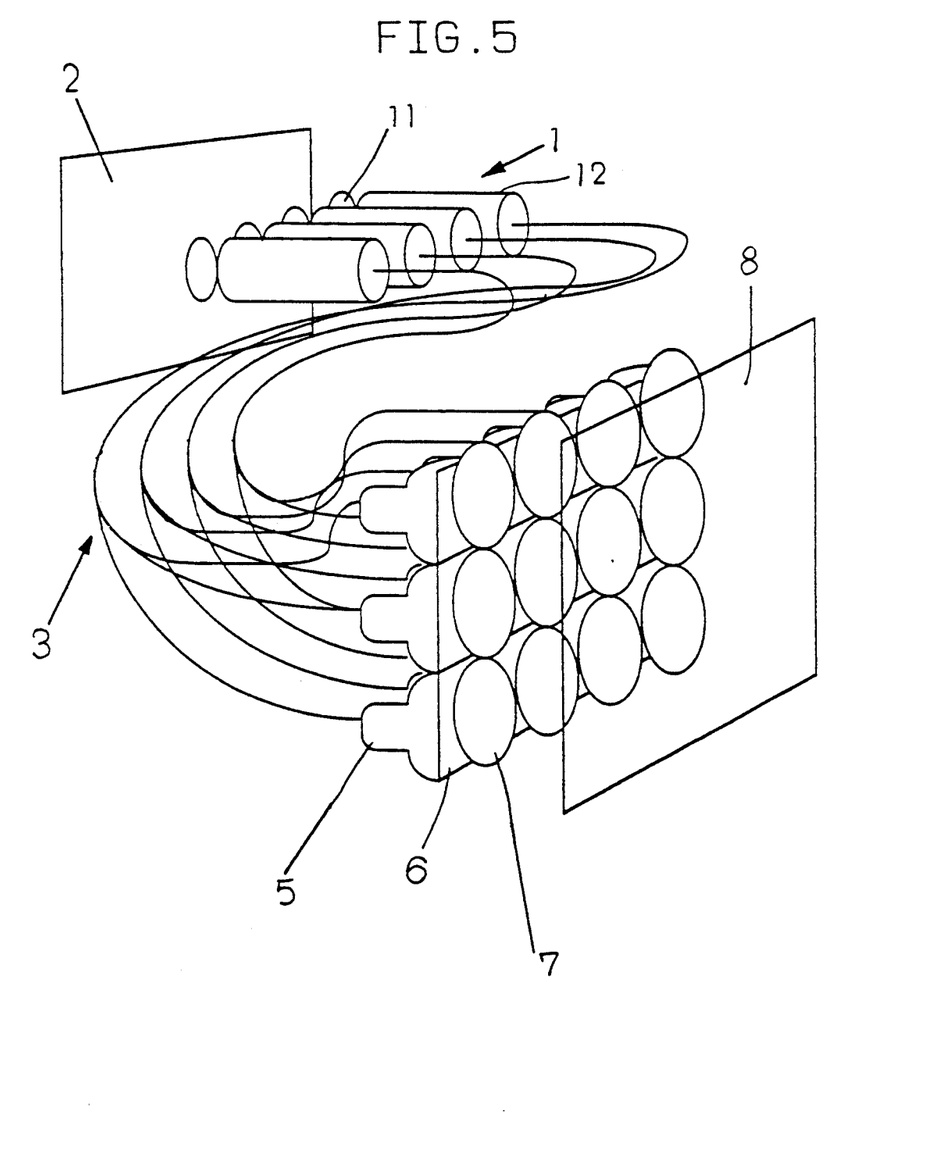
FIG. 5 is an overall perspective view of a fourth embodiment of an autostereoscopic system in accordance with the present invention.

FIG. 5 illustrates a fourth embodiment of an autostereoscopic system in accordance with the present invention.

In the fourth embodiment, a plurality of CRTs 5 are arranged in parallel with each other in the vertical direction in addition to the horizontal direction so that the image output screens 6 of these CRTs 5 are located on the same plane. One TV camera 1 outputs an image signal to the vertically arranged CRTs 5 which are located at the horizontally inverted position of that of the TV camera 1.

The remainder of the constitution of the system of the fourth embodiment is identical to that of the first embodiment. The system of the fourth embodiment can achieve similar operational effect to that of the second embodiment.

Figure 6:
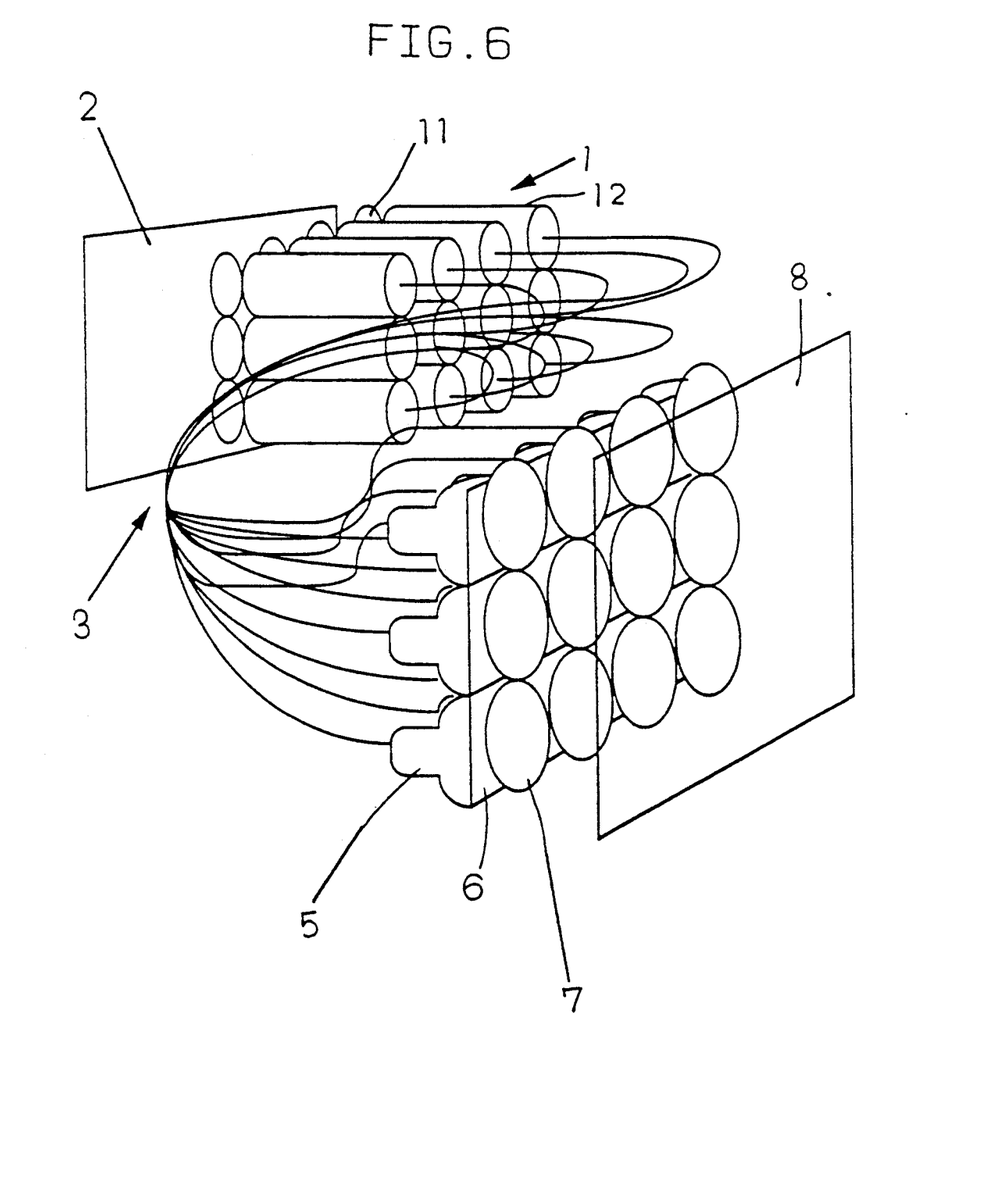
FIG. 6 is an overall perspective view of a fifth embodiment of an autostereoscopic system in accordance with the present invention.

FIG. 6 illustrates a fifth embodiment of an autostereoscopic display system in accordance with the present invention.

In the fifth embodiment, a plurality of TV cameras and a plurality of CRTs are arranged in parallel with each other in the vertical direction in addition to the horizontal direction so that both the lenses 11 of the TV cameras 1 and the image output screens 6 of the CRTs 5 are located on the same plane, respectively. One TV camera 1 outputs an image signal to one CRT 5 which is located at the horizontally and vertically inverted position of that to the one TV camera 1.

The remainder of the constitution of the fifth embodiment is identical to that of the first embodiment.

The system of the fifth embodiment can achieve similar operational effect to that of the first embodiment. Furthermore, an image with both horizontal and vertical parallax can be obtained, thereby imparting depth to the vertical component as well as the horizontal component.

The present invention is not limited to the preceding embodiments. Various modifications are possible.

For example, in place of one large Fresnel convex lens, at least one other large format lens such as a large convex lens, a large concave mirror, a large Fresnel concave mirror, a horizontally focusing Fresnel cylindrical lens and a holographic lens may be used.

When the horizontally focusing Fresnel cylindrical lens is used, a lenticular sheet is used in combination therewith. When a plurality of the above described lenses are used, they are arranged with their optical axes aligned in the horizontal direction.

With regard to the image projecting members in the playback section, in place of the convex lenses, other members such as concave mirrors, Fresnel convex lenses and holographic lenses may used. Or, a plurality of the above-described lenses may be used with their optical axes aligned in the horizontal direction.

With regard to the image output screens, in place of a plurality of output screens, an integral output screen may be used.

With regard to CRT, in place of it, plasma display, light emitting diode or liquid crystal display may be used.

With regard to the taking section, in place of the TV cameras, computer generated images may be used.

Furthermore, the transmission system from the taking section to the playback section may be arbitrarily modified within the scope of the present invention.

Moreover, various images other than three dimensional image can be obtained by arbitrarily selecting the number of parallax images. For example, by alternately displaying the image output screens composed of 1 to n parallax images as a left eye image and a right eye image, stereo images can be observed in the horizontally extending wide range. Or by outputting the same two-dimensional images in every image output screen, the system of the present invention can serve as the two dimensional image display system.

What is claimed is:

1. An autostereoscopic system comprising:
    a taking section for taking an image of a predetermined reference plane with its taking range coincident with said predetermined reference plane, and outputting an image signal formed from a plurality of parallax images based on the taken image of said predetermined reference plane; and
    a playback section including:
        an image output screen having a plurality of image output areas disposed in parallel with one another in the horizontal direction for outputting a plurality of inverted parallax images of those of said image signal output by said taking section;
        a large format lens disposed in front of said plurality of image output areas of an image output screen; and
        a plurality of image projecting members disposed in parallel with one another in the horizontal direction with substantially no space therebetween, said plurality of image projecting members being disposed between said image output screen and said large format lens for projecting said inverted parallax images on or along an effective lens plane of said large format lens in the range equivalent to said reference plane.

2. The autostereoscopic system according to claim 1, wherein said taking section is composed of a plurality of TV cameras, each having a convex lens and an image pickup screen, which are arranged in parallel with each other in the horizontal direction, and said plurality of parallax images are taken on said image pickup screen of each of said TV cameras.

3. The autostereoscopic system according to claim 1, wherein said large format lens is at least one large convex lens.

4. The autostereoscopic system according to claim 1, wherein each of said plurality of image projecting members is at least one convex lens.

5. The autostereoscopic system according to claim 1, wherein a distance d between an effective lens plane of said plurality of image projecting members and said effective lens plane of said large format lens satisfies the following relationship:

$$1/d + 1/D = 1/f$$

wherein f is the focal length of said large format lens and D is the distance between said effective lens plane of said large format lens and a most suitable 3-D image observation position.

6. The autostereoscopic system according to claim 1, wherein said large format lens is at least one large Fresnel convex lens.

7. The autostereoscopic system according to claim 1, wherein said large format lens is at least one large concave mirror.

8. The autostereoscopic system according to claim 1, wherein said large format lens is at least one large Fresnel concave mirror.

9. The autostereoscopic system according to claim 1, wherein said large format lens is at least one horizontally focusing Fresnel cylindrical lens.

10. The autostereoscopic system according to claim 1, wherein said large format lens is at least one holographic lens.

11. The autostereoscopic system according to claim 1, wherein each of said plurality of image projecting members is at least one concave mirror.

12. The autostereoscopic system according to claim 1, wherein each of said plurality of image projecting members is at least one Fresnel convex lens.

13. The autostereoscopic system according to claim 1, wherein each of said plurality of image projecting members is at least one Fresnel concave mirror.

14. The autostereoscopic system according to claim 1, wherein each of said plurality of image projecting members is at least one holographic lens.

15. An autostereoscopic system comprising:
a taking section for taking an image of a predetermined reference plane with its taking range coincident with said predetermined reference plane, and outputting an image signal formed from a plurality of parallax images based on the taken image of said predetermined reference plane; and
a playback section including:
    an image output screen having a plurality of image output areas disposed in parallel with one another in the horizontal direction for outputting a plurality of inverted parallax images of those of said image signal output by said taking section;
    a large format lens disposed in front of said plurality of image output areas of an image output screen; and
    a plurality of image projecting members disposed in parallel with one another in the horizontal direction with substantially no space therebetween, said plurality of image projecting members being disposed between said image output screen and said large format lens for projecting said inverted parallax images on or along the effective lens plane of said large format lens in the range equivalent to said reference plane;
wherein each of said plurality of image projecting members has an elongated configuration in a vertical direction.

16. An autostereoscopic system comprising:
a taking section for taking an image of a predetermined reference plane with its taking range coincident with said predetermined reference plane, and outputting an image signal formed from a plurality of parallax images based on the taken image of said predetermined reference plane; and
a playback section including:
    an image output screen having a plurality of image output areas disposed in parallel with one another in the horizontal direction for outputting a plurality of inverted parallax images of those of said image signal output by said taking section;
    a large format lens disposed in front of said plurality of image output areas of an image output screen; and
    a plurality of image projecting members disposed in parallel with one another in the horizontal direction with substantially no space therebetween, said plurality of image projecting members being disposed between said image output screen and said large format lens for projecting said inverted parallax images on or along the effective lens plane of said large format lens in the range equivalent to said reference plane;
wherein a vertically focusing lenticular sheet is further disposed near said large format lens so s to face said plurality of image projecting members.

17. An autostereoscopic system comprising:
a taking section for taking an image of a predetermined reference plane with its taking range coincident with said predetermined reference plane, and outputting an image signal formed from a plurality of parallax images based on the taken image of said predetermined reference plane; and
a playback section including:
    an image output screen having a plurality of image output areas disposed in parallel with one another in the horizontal direction for outputting a plurality of inverted parallax images of those of said image signal output by said taking section;
    a large format lens disposed in front of said plurality of image output areas of an image output screen; and
    a plurality of image projecting members disposed in parallel with one another in the horizontal direction with substantially no space therebetween, said plurality of image projecting members being disposed between said image output screen and said large format lens for projecting said inverted parallax images on or along the effective lens plane of said large format lens in the range equivalent to said reference plane;
wherein said plurality of image projecting members are disposed in parallel with each other in the vertical direction in addition to the horizontal direction.

18. An autostereoscopic system comprising:
a taking section for taking an image of a predetermined reference plane with its taking range coincident with said predetermined reference plane, and outputting an image signal formed from a plurality of parallax images based on the taken image of said predetermined reference plane; and
a playback section including:
    an image output screen having a plurality of image output areas disposed in parallel with one another in the horizontal direction for outputting a plurality of inverted parallax images of those of said image signal output by said taking section;
    a large format lens disposed in front of said plurality of image output areas of an image output screen; and
    a plurality of image projecting members disposed in parallel with one another in the horizontal direction with substantially no space therebetween, said plurality of image projecting members being disposed between said image output screen and said large format lens for projecting said inverted parallax images on or along the effective lens plane of said large format lens in the range equivalent to said reference plane;
wherein said taking section includes a plurality of TV cameras, each having a convex lens and an image pickup screen, which are disposed in parallel with each other in the horizontal direction, and said plurality of parallax images are taken on said image pickup screen of each of said TV cameras; and
wherein said plurality of TV camera are disposed in parallel with each other in the vertical direction in addition to the horizontal direction, and said plurality of image projecting member are disposed in parallel with each other in the vertical direction in addition to the horizontal direction so as to correspond to said TV cameras.

* * * * *